United States Patent [19]

Boussely

[11] 3,864,295

[45] Feb. 4, 1975

[54] FORMING SYNTHETIC MATERIAL WITH GLYCERYL TRIMONTANATE AS A LUBRICANT

[75] Inventor: Jean Boussely, Paris, France

[73] Assignee: Societe Sapchim-Fournier-Cimag, Paris, France

[22] Filed: Mar. 11, 1974

[21] Appl. No.: 450,085

[52] U.S. Cl... 260/28.5 D, 260/28.5 A, 260/28.5 R, 260/31.6, 264/300
[51] Int. Cl..... C08f 45/36, C08f 45/52, C10m 3/20
[58] Field of Search..... 260/28.5 A, 28.5 D, 28.5 R, 260/31.6; 264/300

[56] References Cited
UNITED STATES PATENTS
3,442,837  5/1969  Brotz et al. ................... 264/300

Primary Examiner—Allan Lieberman
Attorney, Agent, or Firm—Young and Thompson

[57] ABSTRACT

Glyceryl trimontanate has excellent lubricating properties which are displayed upon its addition as an auxiliary agent to the reactive mixture for a synthetic plastic material; the resultant synthetic material is more easily formed such as by extrusion, and has improved shock resistance and transparency.

8 Claims, No Drawings

FORMING SYNTHETIC MATERIAL WITH GLYCERYL TRIMONTANATE AS A LUBRICANT

This is a continuation of application Ser. No. 250,002, filed May 3, 1972 and now abandoned. Application Ser. No. 250,002 is a division of application Ser. No. 34,642 filed May 4, 1970 and now U.S. Pat. No. 3,691,219 granted Sept. 12, 1972.

The present invention relates to forming masses of synthetic material with the use as a lubricant of gylceryl trimontanate which corresponds to the following general formula:

$$\begin{array}{l} R\ COO\text{-}C\text{-}H_2 \\ R\ COO\text{-}C\text{-}H \\ R\ COO\text{-}C\text{-}H_2 \end{array}$$

in which R represents a linearly saturated hydrocarbon chain having 28 carbon atoms and includes products in which the linearly saturated hydrocarbon chain includes 24 to 32 carbon atoms.

The present invention also concerns a process for the preparation of glyceryl trimontanate.

This process comprises, in a general manner, esterifying montanic acid with glyceryl.

Preferably, this esterification corresponds to the following reaction equation:

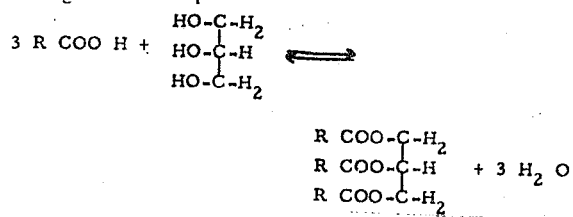

This reaction is carried out directly without any solvant and at a temperature taking account of the pressure so that the water formed is water vapour. The reaction can thus be nearly if not totally carried to completion by the continuous shifting of the balance of the reaction in favour of the formation of the glyceryl trimontanate.

Moreover, in a general manner the kinetics of the reaction can be controlled by the quantity of distilled water as well as by the variation of certain common characteristics of any medium such as the acid number and/or the hydroxyl number.

Preferably, the esterification is carried out in the presence of a catalyst which will speed up the reaction. This catalyst may be an acid catalyst, such as β-naphthalene sulfonic acid; an alkaline catalyst, such as sodium or sodium methylate; a metallic catalyst, such as zinc powder; or any other suitable catalyst.

In practice the quantity of the catalyst which is used is very small; with regard to a catalyst soluble in glyceryl trimontanate, such a catalyst can remain in the final product without in any way affecting the characteristics of the final product other than possibly its colour; and with regard to an alkaline catalyst, its acid number. However, with regard to a catalyst which is insoluble in glyceryl trimontanate such as zinc powder, such a catalyst has to be removed from the final product by filtration.

PREPARATION EXAMPLES

A process for the preparation of glyceryl termontanate according to the invention will now be described in detail by way of examples as follows:

Primary materials.

| | |
|---|---|
| montanic acid | 398 g |
| glycerol | 29.6 g |

These values substantially correspond to the stoichiometric proportions of the abovementioned reaction equation: 1 mole of glyceral to 3 moles of montanic acid.

As far as it is known, pure montanic acid has a linearly saturated hydrocarbon chain of 28 atoms of carbon. In practice montanic acid is commercially available as a product for which the number of carbon atoms of the hydrocarbon chain varies between 24 and 32.

The analysis of montanic acid used had the following characteristics:

| | |
|---|---|
| acid number (A.No.) | 141 |
| saponification number (S.No.) | 150 |
| melting point (m.p.) | 78.5 |
| ash | nil |

Similarly, the glyceryl used had the following characteristics:

| | |
|---|---|
| molecular weight (mol. wt.) | 92.09 |
| refractive index (at 20° C) | 1.4729 |
| density (at 20° C) | 1.260 |
| boiling point | 290° C |

CATALYST USED 0.43 grams of commercially available β-naphthalene sulfonic acid was used as the catalysts and has the following characteristics:

| | |
|---|---|
| molecular weight (mol. wt.) | 208.22 |
| melting point (m.p.) | 102° C |

MODE OF PREPARATION

The glyceral is placed in an apparatus capable of being placed under a vacuum.

The montanic acid is added and then the β-naphthalene sulfonic acid.

Air is then removed from the apparatus as a current of nitrogen is circulated therein. Nitrogen or any other inert atmosphere is circulated herein in order to avoid any possible oxydation of the reactive medium which could give an undesirable colour to the final product. The circulation of the nitrogen is continued until the apparatus is under vacuum as described hereinafter.

The reactive medium is kept in motion and is maintained for 5 hours at 200° C by the heat of the oil bath of the apparatus. The reactive medium become homogeneous towards 80°–90° C and from 140° C the water is collected.

By means of a vacuum pump the pressure in the apparatus is dropped to approximately 5 millibars in 0.25 hours.

At this pressure, the temperature is raised to 220° C in 1 hour while continuing to collect the distilled water. The pressure is so maintained until the acid number of the reactive medium is less than 10 or preferably near 7 which requires approximately 3 hours.

The reaction is then nearly complete.

The ester thus formed is cooled to 150° C. The vacuum is stopped in the apparatus and the cooling is of the ester continued until the temperature reaches 110°–100° C.

The ester in question, glyceryl trimontanate, is in the form of a syrup.

The syrup at 100° C is run across a glass plate in order to obtain a solid layer having a thickness of several millimetres.

This solid layer is broken up and the fragments are ground forming a powder which is then sifted.

RESULTS

With 100 percent yield, 410 grams of glyceryl trimontanate are obtained having the following characteristics:

| | |
|---|---|
| acid number (A.No.) | 8.1 |
| saponification number (S.No.) | 148.5 |
| ester number | 136.5 |
| hydroxyl number (OH.No.) | 12.4 |
| melting point (m.p.) | 77° C |
| molecular weight (mol. wt.) | 1280–1290 |

OTHER MODES OF PREPARATION

Other modes of preparing glyceryl trimontanate have been carried out in which the β-naphthalene sulfonic acid has been substituted by one of the following catalysts, given with the corresponding quantity of which was used:

| | |
|---|---|
| sodium | .43 g |
| sodium methylate | .43 g |
| zinc powder | .86 g |
| zinc oxide powder | .86 g |

The mode of operation remains the same and the results obtained comparable to those indicated above.

Other suitable catalysts could of course be used.

The follow table gives other examples of preparation carried out starting with montanic acid from various sources.

In column A of the table is indicated the nature and quantity in grams of the reactants used; in column B the characteristics of the montanic acid used; and in column C the characteristics of the glyceryl montanate obtained.

It will be noted that in all the cases the hydroxyl number of glyceryl trimontanate obtained in accordance with the process according to the invention is between 10 and 15, and the saponification number is relatively high.

In all the cases the final product obtained can if necessary be bleached for example by an ozidizing agent, such as sodium chlorite, or hydrogen peroxide used in small amounts, or by a bleaching agent such as decolorizing carbon or active carbon.

APPLICATIONS

Glyceryl trimontanate exhibits remarkable properties as an auxiliary agent for masses of synthetic material which are to be formed by molding, extrusion or extrusion-blowing; in particular the following synthetic materials polyvinyl chloride, vinyl copolymers, polystyrene, acrylic resins, methacrylic resins, acrylonitrile-butadiene-styrene (ABS), polyethylene, polypropylene or any other synthetic material.

Firstly, insofar as known, it is necessary to add a lubricating agent to the masses of synthetic material in order to retard as long as possible the sticking to the surfaces of the means in which the material is formed.

It is known to use higher acid esters of polyalcohols such as glyceryl trihydroxy stearate.

Glyceryl trimontanate according to the invention has remarkable qualities as a lubricating agent, far superior to those of lubricating agent already known as is illustrated by the various tests which follow. These tests were all conducted under the same conditions and consisted of recording the time that it took for a sheet of synthetic material passed between cylinders heated to 210° C to begin to stick to the cylinders:

TEST 1

| | |
|---|---|
| - Composition of the sheet: | |
| P.V.C. | 100 |
| Auxiliary agent (adjuvant) | 8 |
| Epoxy oil | 2 |
| α-phenylindole | 0.6 |
| Glyceryl trihydroxy stearate | 2 |
| - Result: | |
| The sheet began to stick at the end of 2 minutes. | |

| Example No. | A | | B | | C | |
|---|---|---|---|---|---|---|
| I | montanic acid | 398.0 | A. No. | 141 | A. No. | 8.1 |
| | glyceral | 29.6 | S. No. | 150 | S. No. | 148.5 |
| | paratoluenesulfonic acid | 0.4 | OH.No. | 20 | OH.No. | 12.4 |
| II | montanic acid | 280.0 | A. No. | 150 | A. No. | 10.1 |
| | glyceral | 23.0 | S. No. | 163.5 | S. No. | 155. |
| | caustic sodalyl (50%) | 0.6 | OH.No. | 20 | OH.No. | 14.5 |
| III | montanic acid | 367.0 | A. No. | 153 | A. No. | 9.2 |
| | glyceral | 29.7 | S. No. | 164 | S. No. | 148 |
| | paratoluenesulfonic | 0.4 | OH.No. | 16 | OH.No. | 14 |
| IV | montanic acid | 359.0 | A.No. | 156 | A.No | 10.4 |
| | glyceral | 29.6 | S.No. | 160 | S.No. | 150 |
| | caustic sodalyl (50%) | 0.8 | OH.No. | 15 | OH.No. | 13 |
| V | montanic acid | 260.0 | A.No. | 158 | A.No. | 9.7 |
| | glyceral | 22.0 | S.No. | 173.5 | S.No | 150 |
| | caustic sodalyl (50%) | 0.56 | OH.No | 27 | OH.No | 15 |

TEST II

| - Composition of the sheet: | |
|---|---|
| P.C.V. | 100 |
| Auxiliary agent (adjuvant) | 8 |
| Epoxy Oil | 2 |
| α-phenylindole | 0.6 |
| Glyceryl trimontanate | 0.5 |
| Glyceryl trihydroxy stearate | 1.5 |
| - Result: | |

The sheet began to stick at the end of 12 minutes.

TEST III

| - Composition of the sheet: | |
|---|---|
| P.V.C. | 100 |
| Auxiliary agent (adjuvant) | 8 |
| Epoxy oil | 2 |
| α-phenylindole | 0.8 |
| Glyceryl trimontanate | 1 |
| Glyceryl trihydroxy stearate | 1 |
| - Result: | |

The sheet began to stick at the end of 20 minutes.

It should be noted that the percentage of α-phenylindole was only increased in order to extend the length of time of thermal stability.

TEST IV

| - Composition of the sheet: | |
|---|---|
| P.V.C. | 100 |
| Auxiliary agent (adjuvant) | 8 |
| Epoxy oil | 2 |
| α-phenylindole | 1 |
| Glyceryl trimontanate | 2 |
| - Result: | |

The sheet began to stick at the end of 25 minutes.

In this first series of tests, the usual lubricating agent was progressively replaced by glyceryl trimontanate according to the invention.

It is seen that this replacement results in a considerable increase in the time at the end of which the synthetic material begins to stick to the cylinders.

This advantageously permits the increase from two to five times the length of continuous service of cylinders before it is necessary to disassemble and clean them.

Other tests were carried out in which the α-phenylindole was replaced by a thio-organic tin compound as follows:

TEST V

| - Composition of the sheet | |
|---|---|
| P.V.C. | 100 |
| Auxiliary agent (adjuvant) | 8 |
| Thio-organic tin compound | 1.5 |
| Glyceryl trihydroxyl stearate | 2 |
| - Result: | |

The sheet began to stick at the end of 3 minutes.

TEST VI

| - Composition of the sheet | |
|---|---|
| P.V.C. | 100 |
| Auxiliary agent (adjuvant) | 8 |
| Thio-organic tin compound | 1.5 |
| Glyceryl trihydroxy stearate | 1.5 |
| Glyceryl trimontanate | 0.5 |
| - Result | |

The sheet began to stick at the end of 10 minutes.

TEST VII

| - Composition of the sheet | |
|---|---|
| P.V.C. | 100 |
| Auxiliary agent (adjuvant) | 8 |
| Thio-organic tin compound | 1.5 |
| Glyceryl trihydroxy stearate | 1 |
| Glyceryl trimontanate | 1 |
| - Result | |

The sheet began to stick at the end of 18 minutes.

TEST VIII

| - Composition of the sheet | |
|---|---|
| P.V.C. | 100 |
| Auxiliary agent (adjuvant) | 8 |
| Thio-organic tin compound | 1.5 |
| Glyceryl trimontanate | 2 |
| - Result | |

The sheet began to stick at the end of 25 minutes.

The result of Tests V–VIII are comparable to those of the preceding tests I–V.

Other test have also been carried out in replacing the glyceryl trihydroxy stearate by one or the other of the esters formed by reacting a polyalcohol such as mono-, di-, or tri-ethylene glycol, mono-, or di-propylene glycol, butanediol, trimethylolpropane, glucoses, saccharoses, penta- or di-pentaerythrite with a higher acid comprising more than 10 atoms of carbon with or without double linking, with or without hydroxyl functions, such as the following acids: lauric, myristic, palmitic, stearic, oleic, linoleic, linolenic, belinic, behenic, phloronic, vaccenic and others. The time in which the sheet began to stick was the same as hereinabove indicated.

In all the cases the lubricating action of the glyceryl trimontanate was not altered, while the lubricating action of the ester was substantially improved.

In practice, the mixture of the glyceryl trimontanate and the other ester can vary between great limits between 15 – 85 percent of glyceryl trimontanate by weight with respect to the total mixture.

Other tests have also been a carried out in which the polyvinyl chloride was replaced by vinyl copolymers, polystyrene, acrilic resins, metacrylic resins, acronitryle-butadiene-styrene, polyethylene and polypropylene.

These tests all confirmed excellent lubricating, anti-sticking and anti-friction qualities of glyceryl trimontanate. Further, as this factor is particularly important relative to the speed at which material can be extruded, the presence of glyceryl trimontanate permits such plastic material to be extruded at a substantially increased speed without sticking.

The fact that glyceryl trimontanate obtained according to the invention has a lower hydroxylnumber is considered to enhance its excellent lubricating quality.

In all the tests described in detail hereinabove, the presence of an auxiliary agent or adjuvant in the composition tested is noted. Such a product is introduced in a known manner into the mixture in order to modify the polymerization structure and thereby improve the physical characteristics of the final product, and particularly as regards to shock resistance. For example with regard to a mixture having a polyvinyl chloride base, such as explained more particularly hereinabove, such an auxiliary agent could for example be an acrylic or derivative acronitryle-butadiene-styrene.

Further, the tests described hereinabove have shown that glyceryl trimontanate, i.e., relative to the second important property of this product, has a tendency when it is in such a mixture to improve the distribution and the compatibility in the polycondensation medium of the auxiliary agent. This results in a better homogeneity of the combination with the following consequences: elimination of fish-eye irregularities and improved uniformity in the ultimate colour of the product.

Finally, the tests showed a third important property of glyceryl trimontanate, i.e., the transparency of the final product is substantially improved when such a product is colourless especially in the case where the initial mixture contains auxiliary agents. The transparency of the final product is improved with increasing amounts of glyceryl trimontanate up to 2 percent of the total mixture by weight.

Accordingly, the transparency of the final product used in Test II was better than that used in Test I and the transparency of the product used in Test III better than that of the product used in Tests I and II. With regard to the transparency of the material used in Test IV, it is nearly perfectly transparent and ressembles a high quality glass.

The similar findings were made with regard to transparency of the material in the Tests V–VIII.

Increasing the amount of glyceryl trimontanate beyond 2 percent of the total mixture by weight increases the time before which the material begins to stick to the cylinders but hardly has an effect on the transparency.

With regard to the transparency of the final product, the transparency of the glyceryl trimontanate is itself important and accordingly a catalyst was chosen for the preparation of the glyceryl trimontanate which would not adversely affect its high transparency.

Finally, the tests which have been carried out have also shown that the synthetic products obtained from mixtures lubricated with glyceryl trimontanate did not develop white lines when folded.

Further, owing to the fact that it is insoluable in water and it has a high melting point, the glyceryl trimontanate does not effect the taste of products which are stored in receptacles formed of a synthetic material which has been lubricated therewith.

In the abovementioned tests, the amount of glyceryl trimontanate was most often limited to 2 percent by weight because of legislation in France which limits the amount to this percentage. In practice systematic tests have been carried out with success between 0.1 and 3 percent of glyceryl trimontanate, these tests have confirmed the remarkable qualities of this product.

I claim:

1. A method of forming a mass of synthetic material selected from the group consisting of polyvinyl chloride and vinyl copolymer, comprising admixing with said material a small but effective amount of glyceryl trimontanate as a lubricant, and thereafter contacting said mass with a solid member to impart a desired form to said mass, said amount being effective to increase the time during which said mass can be in contact with said member without sticking to said member.

2. A method as claimed in claim 1, said amount being in excess of 0.1 percent by weight of the whole.

3. A method as claimed in claim 1, said amount being about 0.1 to 3 percent by weight of the whole.

4. A method as claimed in claim 1, said amount being in excess of about 0.5 percent by weight of the whole.

5. A method as claimed in claim 1, said amount being about 0.5 to 2 percent by weight of the whole.

6. A method as claimed in claim 1, said synthetic material being polyvinyl chloride.

7. A method as claimed in claim 1, said glyceryl trimontanate having the formula

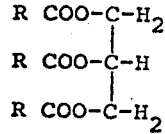

in which R is a linearly saturated hydrocarbon chain having 24 to 32 carbon atoms.

8. A method as claimed in claim 7, said glyceryl trimontanate having a hydroxyl number between 10 and 15.

* * * * *